Patented Mar. 20, 1951

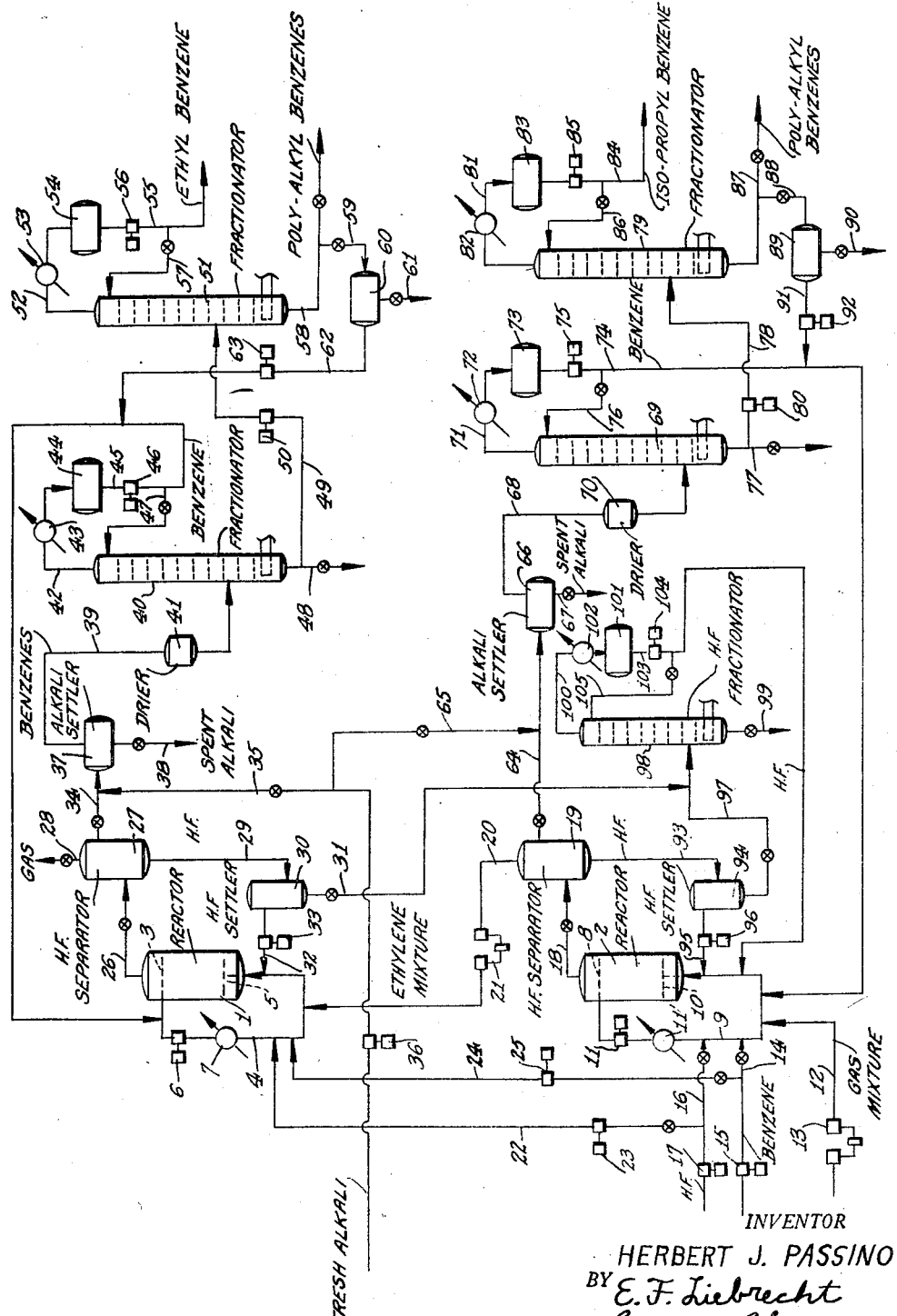

2,545,671

UNITED STATES PATENT OFFICE 2,545,671

ALKYLATION OF AROMATIC HYDROCARBONS

Herbert J. Passino, Englewood, N. J., assignor to The M. W. Kellogg Company, Jersey City, N. J., a corporation of Delaware Original application October 22, 1942, Serial No. 463,010. Divided and this application April 15, 1947, Serial No. 741,525

14 Claims. (Cl. 260—671)

My invention relates to the alkylation of aromatic hydrocarbons with olefin hydrocarbons. More particularly, my invention relates to the ethylation of relatively low-boiling aromatic hydrocarbons, such as benzene, toluene, and the xylenes, in the presence of a catalyst essentially consisting of hydrogen fluoride. This application is a division of my prior co-pending application, Serial No. 463,010, filed October 22, 1942, now abandoned, in which myself and Louis C. Rubin are co-inventors and is a continuation-in-part of my prior co-pending application, Serial No. 395,973, filed May 31, 1941, now abandoned. The prior co-pending application Serial No. 395,973, relates to the alkylation of an aromatic hydrocarbon with an olefin in the presence of hydrogen fluoride as the catalyst, with the catalyst in either the liquid or vapor phase.

I have discovered that low-boiling aromatic hydrocarbons, such as benzene, toluene, and the xylenes, can be ethylated by means of a mixture of gases consisting of ethylene and non-reactive gases, such as methane, ethane, and propane, in the presence of hydrogen fluoride under suitable conditions of temperature and pressure.

An important application of my invention resides in the use of mixtures of hydrocarbon gases produced by thermal or catalytic cracking of hydrocarbons. Such mixtures ordinarily are fractionated to separate therefrom the hydrocarbons having four carbon atoms per molecule, which are employed in the synthesis of gasoline of high octane number and as source materials for other products, such as butadiene. The remaining portion of such cracked gases contains, in addition to ethylene and paraffin hydrocarbons such as methane, ethane, and propane, a substantial proportion of propylene. In the use of such a gas mixture in my process as a source of ethylene for the ethylation of aromatic hydrocarbons, I prefer to remove the propylene in a preliminary step by suitable fractionation or by subjecting the mixture to suitable reaction conditions to convert the propylene selectively to a product which can be separated by fractionation. For example, the gas mixture can be subjected to polymerization or alkylation treatment in the presence of phosphoric acid or sulfuric acid to convert the propylene to a high-boiling product which can be separated easily from the unreacted gases. In this manner the propylene is effectively separated from the gases to be employed in the ethylation step.

In a preferred modification of my process, I subject the gas mixture containing ethylene and propylene to a preliminary alkylation treatment with a suitable aromatic hydrocarbon in the presence of hydrogen fluoride under conditions adapted to effect substantially complete reaction of propylene with the aromatic hydrocarbon while substantially avoiding reaction of ethylene. The preferred modification of my process, therefore, involves a two-step treatment of the gas mixture, in separate reaction zones with intermediate separation of the liquid products, in the presence of aromatic hydrocarbons and hydrogen fluoride. The reaction conditions are regulated in each zone whereby the liquid product of the first alkylation step consists essentially of propylated aromatic hydrocarbons and the liquid product of the second alkylation step consists essentially of ethylated aromatic hydrocarbons. In the application of the preferred modification of my process to the alkylation of benzene the product of the first step consists essentially of isopropyl benzene, which is a valuable ingredient for aviation gasoline because of its high anti-knock value, and the product of the second step consists essentially of ethyl benzene which also is a desirable motor fuel ingredient. Each of these products, moreover, can be employed as a source material for the production of styrene by thermal treatment of the isopropyl benzene and by dehydrogenation of the ethyl benzene.

While the catalyst employed in my invention consists essentially of hydrogen fluoride, minor amounts of other materials may be employed in connection with the hydrogen fluoride as promoters, such as small amounts of boron fluoride or nickel. I prefer to carry out the process under conditions of temperature and pressure at which the hydrogen fluoride is in the liquid state, although the use of hydrogen fluoride in the vapor form is not excluded from the scope of my invention.

In carrying out the ethylation of aromatic hydrocarbons in accordance with my process the aromatic hydrocarbon, or a mixture of aromatic hydrocarbons, or a mixture of hydrocarbons containing an aromatic hydrocarbon to be ethylated, is intimately contacted with a gas mixture consisting essentially of ethylene and non-reactive gases in the presence of hydrogen fluoride at a temperature not substantially lower than 50° F. and under a pressure not substantially lower than 200 pounds per square inch for a time sufficient to effect the desired reaction of ethylene and the aromatic hydrocarbon. While these temperatures and pressures represent substantially minimum values, higher temperatures and higher pressures may be employed with advantage. The maximum permissible temperature is governed by the tendency of the ethylene to polymerize, but temperatures up to 200° F. may be employed with advantage. The maximum permissible pressure also is affected by the tendency of ethylene to polymerize, although this effect is not so noticeable as in connection with the use of high temperatures. Pressures up to 3000 pounds per square inch may be employed without excessive polymerization of the ethylene, although the use of higher pressures is not excluded from the scope of my invention. Inasmuch as the speed of the reaction is promoted by high temperature and especially by high pressure, I prefer to employ as high a pressure and as high a temperature as is practical or permissible.

In the alkylation of aromatic hydrocarbons by means of propylene, or any olefin hydrocarbons other than ethylene which may be present in the gas mixture, the reaction may be carried out in the presence of hydrogen fluoride at lower temperatures and, particularly, lower pressures than in the ethylation step. In the propylation step the temperature should not be substantially higher than room temperature and lower temperatures may be employed with advantage. The pressure in the propylation step should be substantially lower than 200 pounds per square inch, particularly when employing a relatively high temperature, in order to minimize reaction of the ethylene in the gas mixture. Satisfactory conditions for this operation are room temperature and atmospheric pressure.

In both the propylation and the ethylation zones I prefer to maintain the molar ratio of the aromatic reactants to the olefin reactants not lower than 1:1. Preferably, this ratio should be at least 10:1.

The quantity of hydrogen fluoride which should be used in relation to the quantities of hydrocarbon reactants in each reaction zone is not critical, but a sufficient volume of hydrogen fluoride in relation to the volume of hydrocarbons which are present should be maintained to permit intimate mixing and dispersion of the hydrocarbons and hydrogen fluoride. Suitably, the reactions may be carried out by intimately contacting the gas mixture, in the gaseous form, with a liquid mixture of the aromatic hydrocarbons to be alkylated and hydrogen fluoride. Conveniently, the reactions are carried out in the liquid phase in a continuous manner in which an emulsion of hydrogen fluoride and hydrocarbons including the aromatic reactants is contacted with the gas mixture containing the olefin reactant. A portion of the emulsion is withdrawn continuously for recovery of the alkylated product, and fresh supplies of hydrocarbon reactants are added continuously to the reaction zone in the proportions necessary to maintain the desired molar ratio of aromatic reactants to olefin reactants. The hydrocarbons withdrawn from the reaction zone are fractionated to separate hydrocarbons suitable for recycling from the alkylated product.

In such a continuous operation the mixture which is withdrawn is permitted to settle to separate hydrocarbons from the hydrogen fluoride. The settling operation may be conducted at a relatively low pressure to permit evaporation of hydrocarbon gases contained in the mixture. Gases thus separated from the products of the propylation stage of the two-stage operation are passed to the ethylation stage. Gases thus separated from the products of the ethylation stage are substantially denuded of olefin reactants and are withdrawn from the process. The liquid hydrocarbons separated by settling from the hydrogen fluoride are fractionated to separate fractions suitable for recycling and a fraction containing the alkylated product. These hydrocarbons may be treated, for example, with caustic, prior to fractionation to remove residual hydrogen fluoride. Hydrogen fluoride withdrawn from the reaction zones is replaced by the continuous or periodic addition to the reaction zones of recycled or fresh hydrogen fluoride.

In either the propylation step or the ethylation step of my process and when operating on individual aromatic hydrocarbons or mixtures thereof or hydrocarbon mixtures containing aromatic hydrocarbons, the reaction products may include undesired high-boiling products, such as polyalkylated aromatic hydrocarbons. For example, in the ethylation of benzene the reaction products may include di-ethyl benzene and tri-ethyl benzene as well as the desired mono-ethyl benzene. Such high-boiling products may be separated from the desired alkylated aromatic hydrocarbons by fractionation and returned to the reaction zones for conversion to the desired alkylated aromatic hydrocarbons by dealkylation reactions.

My invention will be described further by reference to specific examples of the ethylation of aromatic hydrocarbons by means of a gas mixture consisting of ethylene and non-reactive hydrocarbons and specific examples of the preparation of a gas mixture for such ethylation by the use thereof in a preliminary propylation treatment under conditions adapted to prevent reaction of the ethylene. These examples involve the alkylation of benzene. It should be understood, however, that the invention is not limited to the treatment of benzene but includes within its scope the alkylation of any suitable aromatic hydrocarbon, particularly low-boiling aromatic hydrocarbons such as benzene, toluene, and the xylenes. It is to be understood, furthermore, that the modification of my invention involving a two-stage treatment of the gas mixture does not necessarily require the treatment of the same aromatic material in each stage.

*Example I*

In this operation benzene was successfully ethylated in the presence of hydrogen fluoride under proper reaction conditions by means of a gas mixture consisting of ethylene and non-reactive hydrocarbons. The gas mixture which was employed consisted of 16 volume per cent ethylene, 29 volume per cent ethane and 55 volume per cent methane. A mixture of 1500 cc. of benzene and 200 grams of hydrogen fluoride was maintained in a stirring bomb, and the gas mixture was introduced at the rate of 1 cubic foot per hour. The reaction zone was maintained at room temperature and under a pressure of 400 pounds per square inch. The stirrer was operated at 400 R. P. M. During an operating run of one hour 75 per cent of the ethylene in the gas mixture passed through the bomb was removed. A distillation analysis of the liquid product showed that 93 per cent of the ethylene which was absorbed was converted to mono-ethyl benzene by reaction with benzene. A small amount of high-boiling product accounted for the remainder of the ethylene which was absorbed. This material could be recycled to yield more ethyl benzene.

Example II

In this operation a mixture of propylene, ethylene, ethane and methane was employed in the propylation of benzene in the presence of hydrogen fluoride under conditions adapted to remove propylene from the mixture substantially completely. The gas mixture which was employed contained 19 volume per cent propylene and 77 volume per cent ethylene, the remainder consisting of ethane and methane. This gas mixture was passed through a mixture of benzene and hydrogen fluoride at atmospheric pressure and room temperature. After the gas mixture had been bubbled through the reactor it contained .02 per cent propylene and the liquid product consisted substantially entirely of propylated benzenes. As was demonstrated in Example I, the remaining gas mixture could be employed to ethylate benzene by the application of a higher pressure in excess of 200 pounds per square inch, preferably 300 to 500 pounds per square inch.

Example III

In this operation a gas mixture containing both propylene and ethylene was reacted under conditions selected to remove propylene without substantial reaction of ethylene, and to produce a propylated product of high purity. In this operation 875 grams of benzene and 200 grams of hydrogen fluoride were charged into a stirring bomb in which the stirrer was operated at 400 R. P. M. Into the bomb were introduced over a period of five to six hours a gas mixture consisting of 181 grams of ethylene, 85 grams of propylene and small amounts of saturated gases. The operation was carried out at atmospheric pressure and room temperature. Three grams of propylene were detected in the outlet gas. The remaining 82 grams were represented by monoisopropyl benzene equivalent to 96.2 per cent of the theoretical yield. A small amount of polyisopropyl benzene was also obtained in an amount sufficient to account for the remaining 3.8 per cent of the absorbed propylene. The ethylene passed through the reactor without entering into the reaction. The distillation of the liquid product revealed no ethyl benzene whatever. The ethylene appeared in the outlet gas or was retained in solution in the hydrocarbon layer.

The invention will be described further by reference to the accompanying drawing which is a diagrammatic view in elevation of an arrangement of apparatus for carrying out the embodiment of the invention in which the gas mixture treated contains both propylene and ethylene and related paraffin hydrocarbons, such as propane, ethane, and methane, as well as other gases, such as hydrogen, which are ordinarily found in cracked gases. It is to be understood, however, that the invention is not limited to an operation involving the treatment of a gas comprising propylene and the preliminary treatment of such a gas to remove ethylene therefrom. It is to be understood further that in the embodiment of the invention involving the treatment of a gas comprising both ethylene and propylene the specific method of reacting the propylene disclosed in connection with the drawing is not an essential feature of the invention, although it is preferred that in this modification the general method of reacting the ethylene be applied also to the reaction of the propylene.

Referring to the drawing, a substantially liquid mixture of hydrogen fluoride, benzene, ethylene, and low boiling paraffin hydrocarbon gases is maintained in reactor 1. Similarly a substantially liquid mixture of hydrogen fluoride, benzene, propylene, ethylene, and low boiling paraffin hydrocarbon gases is maintained in reactor 2. Each of these mixtures is continuously agitated by any suitable means to intimately mix the hydrocarbons and hydrogen fluoride. Such mixing results in the formation of an emulsion of the liquid hydrocarbons and hydrogen fluoride. Conveniently, agitation is effected by withdrawing a portion of the mixture in the reactor from an upper part thereof and recycling the mixture thus withdrawn into a distributing element in the lower portion of the reactor. In reactor 1 a portion of the mixture is withdrawn through collecting means 3 and recirculated through line 4 into a distributing element 5 located in the lower portion of the reactor 1. Line 4 is provided with a pump 6, and distributing element 5 is provided with suitable injection means for introducing the recirculated mixture in a parallel row of jets whereby the body of reactants and hydrogen fluoride in reactor 1 is violently agitated and intimate mixing of the reactants and catalyst is effected.

In operations at relatively low temperatures the heat developed by the exothermic alkylation reactions may necessitate the provision of means for cooling the reaction mixture to maintain the reaction temperature at the desired level. To effect such cooling, any suitable means for refrigerating the reacting mixture by indirect heat exchange may be provided. Conveniently, cooling is effected by passing the circulated mixture through cooling means 7 located in line 4, preferably between pump 6 and distributing element 5.

Reactor 2 is provided with means for agitation and cooling of the reaction mixture in a manner similar to reactor 1. A portion of the reaction mixture in reactor 2 is withdrawn therefrom through collecting means 8 and recirculated through line 9, which connects with distributing element 10 located in the lower portion of reactor 2. Line 9 is provided with a pump 11 and cooling means 11' to serve the same purposes as pump 6 and cooling means 7 in line 4.

A reaction gas mixture comprising propylene, ethylene, and low boiling paraffin hydrocarbons, such as propane, ethane, and methane, is introduced into the system through line 12 which connects with line 9 and is provided with a compressor 13 for introducing the gas mixture into the liquid mixture passing through line 9 at the operating pressure.

Benzene is introduced in the system through line 14 which connects with line 9 and is provided with a pump 15.

Hydrogen fluoride in a liquid condition is introduced into the system through line 16 which connects with line 9 and is provided with a pump 17.

The mixture of hydrogen fluoride and hydrocarbons flowing through line 9 emerges therefrom into the interior of reactor 2 through distributing element 10 which is provided with suitable injection means. The resulting mixture of recirculated emulsion, fresh feed hydrocarbons, fresh reactants and catalyst, and reactants and catalyst recycled from the operation in a manner to be described below, is intimately mixed by the injection means at 10 whereby the propylene in reactor 2 reacts substantially entirely with benzene to form isopropyl benzene. As described above, the temperature and pressure applied to reactor 2 are regulated to provide reaction conditions under which propylene introduced therein is reacted substantially entirely without substantial reaction of ethylene. Room temperature, or lower, and atmospheric pressure are satisfactory.

A portion of the reaction mixture in reactor 2, the equivalent in volume to the quantity of catalyst and hydrocarbons introduced into line 9 from lines 12, 14, and 16, and catalyst and hydrocarbons recycled in the manner to be described below, is withdrawn continuously from reactor 2 through line 18. Preferably the point of withdrawal of reaction mixture through line 18 is located somewhat above the collecting means 8 whereby preliminary separation of hydrogen fluoride from the hydrocarbon phase of the emulsion may be effected in the portion of reactor 2 above collecting means 8. In this manner the material withdrawn through line 18 contains a smaller portion of hydrogen fluoride than the mixture in reactor 2 as a whole. This reduces the amount of hydrogen fluoride which must be recycled.

The reaction mixture withdrawn through line 18 from reactor 2 is introduced into separator 19 at a reduced pressure. In separator 19 the pressure is maintained sufficiently low to permit evaporation and separation of substantially all low boiling hydrocarbons contained in the hydrocarbon phase. The gas mixture thus separated is withdrawn overhead from separator 19 through line 20 which connects with line 4 and is provided with a compressor 21. By means of line 20 and compressor 21 the gas mixture separated in separator 19, comprising ethylene, as the sole olefin constituent, and low boiling paraffin hydrocarbon gases, is introduced into the circulating liquid mixture in line 4 at the operating pressure of reactor 1.

Reactor 1 is maintained at a pressure of at least 200 lbs. per square inch, preferably 400 to 500 lbs. per square inch. Any temperature up to that at which substantial polymerization of the ethylene occurs may be employed. A temperature as high as 200° F. may be employed without effecting substantial polymerization, particularly if a high ratio of benzene to ethylene is maintained in reactor 1. The important factor in promoting ethylation of the benzene is, however, the pressure maintained in reactor 1, and room temperature may be employed satisfactorily if a sufficiently high pressure is maintained. Pressures up to 3,000 lbs. per square inch may be employed, but those in the range 400 to 500 lbs. per square inch are found to be satisfactory.

In addition to the gas mixture introduced into line 4 from line 20 recycled benzene and recycled hydrogen fluoride are introduced into line 4. Fresh hydrogen fluoride in an amount sufficient to maintain the quantity of this material in the ethylation reaction system at the desired figure is introduced into line 4 from line 22 which connects line 16 with line 4. If necessary, a pump 23 may be provided in line 22 to overcome the relatively high pressure maintained in reactor 1 as compared to that of reactor 2.

Fresh benzene in an amount equivalent to the benzene withdrawn from the ethylation reaction system as reaction product or as benzene entrained in the reaction product is introduced into line 4 through line 24, which connects line 14 with line 4. If necessary a pump 25 may be provided in line 24 to overcome the relatively high pressure of reactor 2. The mixture of hydrogen fluoride and hydrocarbons flowing through line 4 emerges therefrom into the interior of reactor 1 through distributing means 5, which is provided with suitable injection means, such as nozzles. The resulting mixture of recirculated emulsion, including fresh feed hydrocarbons and reactants and recycled hydrocarbons and reactants, is intimately mixed by the injection means at 5. As a result of the suitable reaction conditions imposed on the reaction mixture in reactor 1, and the intimate contact of ethylene with the benzene contained therein, substantially complete reaction of ethylene and benzene is effected with the formation of ethyl benzenes, which predominate in mono-ethyl benzene.

A portion of the reaction mixture in reactor 1 is withdrawn continuously from reactor 1 through line 26. Preferably the point of withdrawal of reaction mixture through line 26 is located above collecting means 3 whereby a preliminary partial separation of hydrogen fluoride from the hydrocarbon phase of the emulsion may be effected in a manner described in connection with reactor 2 and line 18.

The reaction mixture withdrawn from reactor 1 through line 26 is introduced into separator 27 at reduced pressure. In separator 27 the pressure is maintained sufficiently low to permit evaporation and separation of low boiling hydrocarbons contained in the hydrocarbon phase. This gas mixture consisting substantially entirely of low boiling paraffin hydrocarbon gases and other relatively inert constituents, such as hydrogen, is withdrawn overhead from separator 27 through line 28. This gas mixture is withdrawn from the process for further use elsewhere, for example as fuel.

In separator 27 the liquid materials separate into a lower phase consisting essentially of hydrogen fluoride and an upper phase consisting essentially of alkylated benzenes and benzene.

The hydrogen fluoride phase separated in separator 27 is withdrawn therefrom through line 29 which connects separator 27 with a hydrogen fluoride settler 30. In settler 30 the hydrogen fluoride is maintained as a relatively quiescent body to permit settling of relatively heavy materials consisting principally of complexes of hydrocarbon reactants and hydrogen fluoride. This operation assists in maintaining the catalytic activity of the remaining hydrogen fluoride at a satisfactory level.

The heavy material separated in settler 30 is withdrawn through line 31 for further treatment in a manner to be described below. The hydrogen fluoride is withdrawn from the upper portion of settler 30 through line 32 which connects with line 4 and thus provides for recycling hydrogen fluoride to reactor 1. Line 32 is provided with a pump 33 for recycling the hydrogen fluoride against the operating pressure in reactor 1.

The hydrocarbon mixture separated as the upper liquid phase in separator 27 is withdrawn therefrom through line 34. In order to remove any hydrogen fluoride entrained in the hydrocarbon mixture flowing through line 34 a suitable quantity of alkali solution is introduced into line 34 by means of line 35. Line 35 is connected to a suitable source of alkali solution, not shown, and is provided with a pump 36.

Line 34 connects with an alkali settler 37, whereby the mixture of hydrocarbons, alkali, and neutralized hydrogen fluoride is permitted to separate into an upper phase containing the hydrocarbons substantially free of hydrogen fluoride and a lower alkali phase containing the reaction product of the neutralization of the hydrogen fluoride. The spent alkali is withdrawn from settler 37 through line 38.

The hydrocarbon mixture, substantially free of hydrogen fluoride, is withdrawn overhead from settler 37 through line 39, which connects with a fractionator 40. If desired, a suitable drier 41 is interposed in line 39 to remove traces of water from the hydrocarbon mixture.

In fractionator 40 the hydrocarbon mixture is fractionated into a vapor fraction consisting essentially of benzene and a liquid fraction consisting essentially of the alkylated benzenes. Fractionator 40 is provided with suitable fractionating means to effect substantially complete separation of benzene from the alkylated benzenes. The benzene passes overhead as a vapor from fractionator 40 through line 42. Cooling means 43 are interposed in line 42 to cool the vaporized benzene sufficiently to liquefy it. Line 42 connects with drum 44 in which the liquid benzene is permitted to accumulate.

Liquid benzene is withdrawn from accumulator drum 44 through line 45 which connects with line 4 whereby the liquid passing through line 45 is recycled to the reaction zone in reactor 1. Line 45 is provided with a pump 46 to effect such recycling of benzene against the pressure maintained in reactor 1.

A portion of the benzene flowing through line 45 may be diverted therefrom through line 47 and returned to the upper portion of fractionator 40 as reflux to assist in the fractionation operation.

The alkylated benzenes, consisting predominantly of ethyl benzene, are withdrawn from the lower portion of fractionator 40 through line 48. This material may be withdrawn from the system for further treatment elsewhere. Preferably, however, the alkylated benzenes withdrawn through line 48 are subjected to further fractionation in the system. For this purpose, line 49, suitably provided with a pump 50, is provided to connect line 48 with a second fractionator 51. In fractionator 51 conditions and means are provided to separate ethyl benzenes substantially completely from poly alkyl benzenes, such as diethyl benzenes. The ethyl benzene is separated overhead as a vapor and is withdrawn from fractionator 51 by means of line 52. Line 52 is provided with cooling means 53 to condense the ethyl benzene. Line 52 connects with accumulator drum 54 in which the liquid ethyl benzene is permitted to accumulate. Ethyl benzene, which constitutes the principal product of the process, is withdrawn from accumulator drum 54 through line 55, provided with a pump 56. A portion of the ethyl benzene flowing through line 55 may be diverted therefrom through line 57 and returned to the upper portion of fractionator 51 as reflux.

The poly alkyl benzenes which are separated as a liquid condensate in fractionator 51 are withdrawn from the lower portion thereof through line 58. This material may be withdrawn from the process for further handling elsewhere, but preferably is recycled to the reaction zone in reactor 1 in whole or in part. By this means the poly ethyl benzenes, such as diethyl benzene, which constitute substantially the whole of the condensate withdrawn through line 58, are converted to ethyl benzene by disproportionation reactions, such as de-ethylation. For this purpose, a portion of the material flowing through line 58 is diverted therefrom through line 59. Line 59 preferably connects with an accumulator-settler 60. In settler 60 high boiling complexes and resinous materials are permitted to settle and separate from the remainder of the poly alkyl benzenes and are withdrawn through line 61. The poly alkyl benzenes remaining in settler 60 are withdrawn therefrom through line 62 for recycling to reactor 1. Conveniently, this is accomplished by connecting line 62 with line 45 and providing a pump 63 in line 62.

The upper liquid phase separated in separator 19 consisting essentially of benzene, isopropyl benzene and poly alkyl benzenes, is withdrawn therefrom through line 64. In order to neutralize hydrogen fluoride which may be entrained in material flowing through line 64, alkali solution is introduced into line 64 through line 65, which connects with line 35. The mixture of alkali solution and hydrocarbons passes from line 64 into alkali settler 66. In settler 66 the mixture separates into an upper hydrocarbon phase substantially free from hydrogen fluoride, and a lower alkali phase containing the reaction product of the neutralization of the hydrogen fluoride. The lower phase is withdrawn from settler 66 through line 67.

The hydrocarbon mixture is withdrawn from settler 66 through line 68 which connects with a fractionator 69. A drier 70 may be interposed in line 68 for removing water entrained in the hydrocarbon mixture passing therethrough.

Operating conditions and fractionating means are maintained in fractionator 69 to effect separation overhead of a vapor fraction consisting essentially of substantially all benzene in fractionator 69. The vapors are withdrawn overhead through line 71 and are condensed by cooler 72 in line 71. The condensed benzene passes from line 71 into accumulator 73 from which it is withdrawn and recycled to reactor 2 through line 74, which connects accumulator 73 with line 9. A pump 75 is provided in line 74 in order to recycle the benzene against the operating pressure in reactor 2. A portion of the benzene flowing through line 74 may be diverted therefrom through line 76 and introduced into the top of fractionator 69 as reflux.

The condensate separated in fractionator 69, consisting essentially of isopropyl benzene and poly alkyl benzenes is withdrawn therefrom through line 77. Preferably this material is subjected to further fractionation treatment to separate isopropyl benzene from higher boiling materials. For this purpose all or a portion of the condensate withdrawn through line 77 is diverted therefrom through line 78 which connects line 77 with fractionator 79, and is provided with a pump 80.

In fractionator 79 operating conditions and fractionating means are provided to separate overhead a vapor fraction consisting essentially of isopropyl benzene. These vapors are withdrawn overhead through line 81 and are condensed by passage through cooler 82. The condensed isopropyl benzene passes from line 81 to accumulator 83 from which it is withdrawn through line 84, provided with a pump 85. A portion of the isopropyl benzene flowing through line 84 may be diverted therefrom through line 86 and introduced into the upper portion of fractionator 79 as reflux.

The condensate fraction separated in fractionator 79, and consisting of poly alkyl benzenes, such as di-isopropyl benzene, is withdrawn from fractionator 79 through line 87. Preferably this material is recycled wholly or in part to reactor 2 to effect conversion of di-isopropyl benzene and similar benzenes to mono-isopropyl by disproportionation reactions, such as de-alkylation. For this purpose a portion of the material flowing through line 87 is diverted therefrom through line 88, which connects with an accumulator-settler 89. In settler 89 heavy sludge-like materials, including complexes of hydrogen fluoride and hydrocarbon reactants, are separated by settling and withdrawn through line 90. The remaining polyalkyl benzenes are withdrawn from settler 89 through line 91, provided with a pump 92. For recycling of this material to reactor 2, line 91 conveniently connects with line 74.

The hydrogen fluoride phase separated in the bottom of separator 19 is withdrawn therefrom through line 93, which connects with hydrogen fluoride settler 94. In settler 94 relatively heavy material consisting principally of complexes of hydrocarbons and hydrogen fluoride is separated by settling. The remaining hydrogen fluoride is withdrawn from the upper portions of settler 94 through line 95, provided with pump 96, to permit recycling of this hydrogen fluoride to reactor 2. The heavy material separated by settler 94 is withdrawn therefrom through line 97 which connects with a hydrogen fluoride fractionator 98. Similar material separated in hydrogen fluoride settler 30, and withdrawn therefrom through line 31, is introduced into fractionator 98 by connecting line 31 with line 97.

In fractionator 98 fractionating conditions and suitable fractionating means are provided to regenerate and separate hydrogen fluoride vapors from a heavy residue, which is withdrawn from fractionator 98, and from the system, through line 99.

The hydrogen fluoride vapors separated in fractionator 98 are withdrawn overhead therefrom through line 100 which connects with accumulator 101. Cooling means at 102 in line 100 cool the hydrogen fluoride sufficiently to condense it. The liquefied hydrogen fluoride in accumulator 101 is recycled to reactor 2 through line 103, provided with pump 104, which connects accumulator 101 with line 9. A portion of the hydrogen fluoride flowing through line 103 may be withdrawn therefrom and introduced into the upper portion of fractionator 98 as reflux through line 105.

I claim:

1. In a process of alkylating aromatic compounds, reacting an olefin-containing gas with an aromatic hydrocarbon by vapor phase hydrogen fluoride catalyst promoted by boron fluoride at a temperature at which the reaction proceeds without substantial polymerization and at a pressure to maintain the hydrogen fluoride and boron trifluoride in the vapor phase at said temperature and for a time sufficient to effect the desired alkylation.

2. In a process of alkylating aromatic compounds, reacting an olefin-containing gas with an aromatic hydrocarbon by vapor phase hydrogen fluoride catalyst promoted by boron fluoride at a temperature of not over 200° F. at which the reaction proceeds and at a pressure to maintain the hydrogen fluoride and the boron trifluoride in the gaseous phase at said temperature and for a time sufficient to effect the desired alkylation.

3. In a process of alkylating aromatic compounds, reacting an olefin-containing gas with an aromatic hydrocarbon by vapor phase hydrogen fluoride catalyst promoted by boron fluoride at a temperature of not over 200° F. at which the reaction proceeds and at a superatmospheric pressure and for a time sufficient to effect the desired alkylation.

4. In a process of alkylating aromatic compounds, reacting an olefin-containing gas with a larger proportion of an aromatic hydrocarbon by vapor phase hydrogen fluoride catalyst promoted by boron fluoride, at a temperature not over 200° F. at which the reaction proceeds and a super atmospheric pressure and for a time sufficient to effect the desired alkylation.

5. In a process of alkylating aromatic compounds, reacting ethylene with benzene in proportions of 1 mol of the former to 3–15 mols of the latter by vapor phase hydrogen fluoride promoted by a smaller amount of boron fluoride, at a temperature not over 200° F. at which the reaction proceeds and pressure at least 50 pounds per square inch and for a time sufficient to effect the desired alkylation.

6. In a process of alkylating aromatic compounds, reacting an olefin-containing gas with an aromatic hydrocarbon by vapor phase hydrogen fluoride catalyst promoted by boron fluoride at a temperature of not over 200° F. at which the reaction proceeds and at a pressure of at least 200 pounds per square inch and for a time sufficient to effect the desired alkylation.

7. In a process of alkylating aromatic compounds, reacting an olefin-containing gas with a larger proportion of an aromatic hydrocarbon by vapor phase hydrogen fluoride catalyst promoted by boron fluoride, at a temperature not over 200° F. at which the reaction proceeds and pressure at least 200 pounds per square inch and for a time sufficient to effect the desired alkylation.

8. In a process of alkylating aromatic compounds, reacting ethylene with benzene in proportions of 1 mol of the former to at least 10 mols of the latter by vapor phase hydrogen fluoride promoted by a smaller amount of boron fluoride, at a temperature not over 200° F. at which the reaction proceeds and pressure at least 200 pounds per square inch and for a time sufficient to effect the desired alkylation.

9. In a process of alkylating aromatic compounds, reacting ethylene with benzene in proportions of 1 mol of the former to at least 1 mol of the latter by vapor phase hydrogen fluoride promoted by a smaller amount of boron fluoride, at a temperature not over 200° F. at which the reaction proceeds and pressure at least 200 pounds per square inch and for a time sufficient to effect the desired alkylation.

10. The method for ethylating single-ring aromatic hydrocarbons which comprises contacting a single-ring aromatic hydrocarbon and a mixture of gases whose hydrocarbon content consists essentially of ethylene and paraffin hydrocarbons in the presence of a vapor phase catalyst essentially consisting of hydrogen fluoride at a temperature not over about 200° F. at which the reaction proceeds and under a pressure not substantially lower than about 200 pounds per square inch for a time sufficient to react said ethylene with said aromatic single-ring hydrocarbon.

11. The method for propylating an aromatic hydrocarbon which comprises contacting an aromatic hydrocarbon with propylene in the presence of a vapor phase hydrogen fluoride catalyst promoted by boron fluoride at a temperature not substantially lower than about 50° F. and at which the reaction proceeds without substantial polymerization for a time sufficient to effect the desired propylation.

12. The method for propylating benzene which comprises contacting benzene with propylene in the presence of a vapor phase hydrogen fluoride catalyst promoted by boron fluoride at a temperature not substantially lower than about 50° F. and at which the reaction proceeds without substantial polymerization for a time sufficient to effect the desired propylation.

13. In a process of alkylating aromatic compounds, reacting ethylene with a larger proportion of benzene by vapor phase hydrogen fluoride promoted by a smaller amount of boron fluoride, at a temperature not over 200° F. at which the reaction proceeds and at a superatmospheric pressure and for a time sufficient to effect the desired alkylation.

14. A process for alkylating an aromatic hydrocarbon which comprises contacting an aromatic hydrocarbon with an olefin in the presence of a vapor phase hydrogen fluoride catalyst promoted by boron fluoride at a temperature between about room temperature and about 200° F. at which the reaction proceeds and at a pressure to maintain the hydrogen fluoride and boron trifluoride promoter in the vapor phase at said temperature for a time sufficient to effect the desired alkylation, the mol ratio of aromatic hydrocarbon to olefin being not lower than about 1:1.

HERBERT J. PASSINO.

REFERENCES CITED

The following references are of record in the file of this patent:

UNITED STATES PATENTS

| Number | Name | Date |
| --- | --- | --- |
| 1,933,434 | Hofmann et al. | Oct. 31, 1933 |
| 2,275,312 | Tinker et al. | Mar. 3, 1942 |
| 2,373,580 | Linn | Apr. 10, 1945 |
| 2,399,662 | Burk et al. | May 7, 1946 |
| 2,423,470 | Simons | July 8, 1947 |